US006659221B2

(12) United States Patent
Kuroda et al.

(10) Patent No.: US 6,659,221 B2
(45) Date of Patent: Dec. 9, 2003

(54) ENGINE INTAKE SILENCER

(75) Inventors: Tatsuya Kuroda, Wako (JP); Tetsu Wada, Wako (JP); Haruo Tsusaka, Wako (JP); Hideo Watanabe, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 10/076,772

(22) Filed: Feb. 13, 2002

(65) Prior Publication Data

US 2002/0108809 A1 Aug. 15, 2002

(30) Foreign Application Priority Data

Feb. 14, 2001 (JP) ........................................ 2001-036695

(51) Int. Cl.[7] ................................................ B64D 33/02
(52) U.S. Cl. ........................................ 181/214; 181/212
(58) Field of Search ................................ 181/214, 212, 181/217, 218

(56) References Cited

U.S. PATENT DOCUMENTS 4,065,276 A * 12/1977 Nakaya et al. ................ 96/380
5,913,295 A * 6/1999 Sadr et al. .............. 123/198 E
6,312,650 B1 * 11/2001 Frederiksen et al. ........ 422/180

FOREIGN PATENT DOCUMENTS

JP 08093433 4/1996

* cited by examiner

*Primary Examiner*—Kimberly Lockett
(74) *Attorney, Agent, or Firm*—Adams & Wilks

(57) ABSTRACT

A box-shaped intake silencer for an engine is obtained by joining together an upper half and a lower half. The intake silencer includes a connecting duct for supplying air to the engine and an intake duct for bringing in outside air. The intake silencer brings in a blow-by gas generated by the engine and returns fresh air purified by a filter to the engine. The filter is inserted into a retaining part made up of the upper and lower halve and held at the retaining pat by joining the upper and lower halves together.

10 Claims, 6 Drawing Sheets

II
II
1
2
2a
2b
2c
3
4
5
6
7a
7b
7c
8
9
9a
9b
10
11
12
13
14
15
16
17
18
19
20
21
22
23
30
31
32
33
34
36
36a
36b
39
45
50
51
52

1
2
4
8
31
30
7
6
42
45
9
9b
9b
35
35
9
33
S
52
12a
10A
10
10
51
46
47
13
50
12a
12

36
36b
36a
36b
31
30a 30
32
31b
41
31a
35
37
41a
45
44
33
32a
43b
43
35
31a 30
31
31a
32
32a
33
34
35
35
36
36a
36b
36b
39
39a
40
41
42
5
5

44
43b 43
43a
43a
45
45a
31b 31
37b
37
37a
30
38
39
39b
41a
39a
41
32c
34
42
47
40
40
42a
32b
32

31
34a
43
41a
31b
30
39
43a
41
43b
44
43a
37
45
39b
39a
34
32c
40
47
42
42a
32b
40
32

31
30

148
149
45
137
139
141
47
142
143a
143
144
140
132
32

ENGINE INTAKE SILENCER

FIELD OF THE INVENTION

The present invention relates generally to an improvement in an intake silencer (muffler) attached to an outboard engine of a boat, for example. More particularly, the invention relates to an intake silencer for an engine having a breather passage formed in the intake silencer for returning a blow-by gas and a filter for purifying the blow-by gas passing through the breather passage.

BACKGROUND OF THE INVENTION

Various outboard engines are known in which a space defined in a cylinder head cover and a muffling chamber defined in an intake silencer are interconnected in gas communication by a breather passage so that a blow-by gas generated in the engines can be returned through the breather passage to an engine intake path. An example of such outboard engines is disclosed in Japanese Patent Laid-Open Publication No. HEI-8-93433.

A filter is placed on the breather passage in order to prevent mist in the blow-by gas and impurities such as lubricating oil in the cylinder head cover from entering into the gas to be returned to the engine intake path.

There are drawbacks, however, to placing a filter in the breather passage. For example, components used for the path can take up more space, there may be difficulty in securing a large enough space for the filter in a small outboard engine space, the filter may require a complex support structure, and a large engine cover, forming an outer part of the outboard engine, may be needed.

Furthermore, in the conventional breather passage, an outlet member on a cylinder head side is placed at a higher level, while an inlet member on the intake silencer is placed at a lower position. Because of a height difference between the outlet member and the inlet member, oil in the cylinder head can easily flow into the intake silencer, thereby causing the filter to get dirty and degrade rapidly.

In addition, operation for replacing an old filter with a new one must be performed in a small engine space of the outboard engine. Thus, there is a need to simplify the replacement operation.

SUMMARY OF THE INVENTION

It is therefore an object of the present invention to address the issues listed above by providing an arrangement that facilitates disposition and removal of a filter for removing impurities, such as oil in the blow-by gas passing through the breather space, without adversely affecting a small space within an outboard engine.

Another object of this invention is to provide an intake silencer for an engine that prevents the filter from getting dirty and degrading rapidly.

According to an aspect of the present invention, there is provided an engine intake silencer, communicating through a breather passage with a space defined in a cylinder head cover of an engine, for returning a blow-by gas generated inside the engine to an intake side of the engine, comprising: a main box unit formed by joining an upper half and a lower half unitarily; a connecting duct for connection to the intake side of the engine; an intake duct for bringing in outside air; and a filter for purifying the blow-by gas, the filter being held by the upper and lower halves within the main box unit communicating with the space defined in the cylinder head cover.

The filter can be placed within the intake silencer, whose main unit comprises the upper and lower halves, by fitting the filter into retaining parts formed on the upper and lower halves and joining the upper and lower halves. Because the filter is placed inside a chamber of the intake silencer which guides the blow-by gas to the intake side through the breather passage in the engine, that supplies new air to the intake side by introducing the blow-by gas to the intake silencer for returning the blow-by gas to the intake side, there is no need to create a filter retaining part in the breather passage, and a filter support structure is simplified. In addition, the filter for the blow-by gas in the breather space can be installed without adversely affecting a small space inside the engine.

In a preferred form, the upper half of the intake silencer has a filter retaining portion with an opening, the opening is closed by a lid connected via a connecting member to the lower half, and the filter is held between a retaining portion provided on a rear surface of the lid and a retaining portion provided on the lower half. As a result, the filter can be installed and removed by taking the lid that covers the opening of the upper half of the intake silencer and inserting or taking out the filter from the opening. Because the filter can be installed and taken out very easily, maintenance becomes easier. Also, the filter can be changed without involving the breather passage components. When the outboard engine of the boat is a vertical engine with vertically placed crankshafts and the intake silencer is placed on the upper part of the engine, the filter can be changed easily and rapidly by taking the engine cover off.

Preferably, the lower half of the intake silencer has a bottom with an opening formed at a part of the bottom, the opening is closed by releasably attaching thereto a bottom lid member from below, the filter is retained by a retaining portion provided on a top surface of the bottom lid member, and the bottom lid member has a connecting portion, provided on a part thereof upstream of the filter, for forming the breather passage. In other words, the filter may be put in place or taken out by attaching or removing the bottom lid from the opening made in the bottom of the lower half unit of the intake silencer. As a result, filter installation and removal becomes very easy, and maintenance involving filter exchange becomes easier. In addition, the filter changing operation can take place without involving the breather passage components. The filter changing operation can be performed easily and quickly by removing the engine cover, when the outboard engine is a vertical engine with a vertically placed crankshaft, and the intake silencer is placed on the top part of the engine. Because the bottom lid includes a retaining part for the filter, the retaining part holds the filter, and the bottom lid is placed from below, to close the opening in the lower half, by screwing on the bottom lid, the structures of the upper and lower halves themselves are also simplified. Furthermore, a connecting portion for forming the breather passage is placed at the bottom lid, and the connecting portion is connected to the cylinder head cover side with a breather tube to thereby simplify the process of forming the breather passage in the intake silencer.

Desirably, the breather passage of the intake silencer has an inlet disposed at a higher position, and the breather passage of the cylinder head cover has an inlet disposed at a lower position. Although the breather passage connects the inside of the cylinder head cover and the inside of the intake silencer in a communicating fashion, oil and other components are unlikely to go through the breather passage into the intake silencer, because the exhaust part at the cylinder head cover side is at a lower position than the intake part at the intake silencer. As a result, it is possible to prevent premature degradation of the filter, make the filter last longer, and avoid a need to change the filter too early. These advantages lead to cost reductions.

BRIEF DESCRIPTION OF THE DRAWINGS

Certain preferred embodiments of the present invention will be described in detail herein below, by way of example only, with reference to the accompanying drawings, in which.

DETAILED DESCRIPTION OF THE PREFERRED EMBODIMENTS

Figure 1:
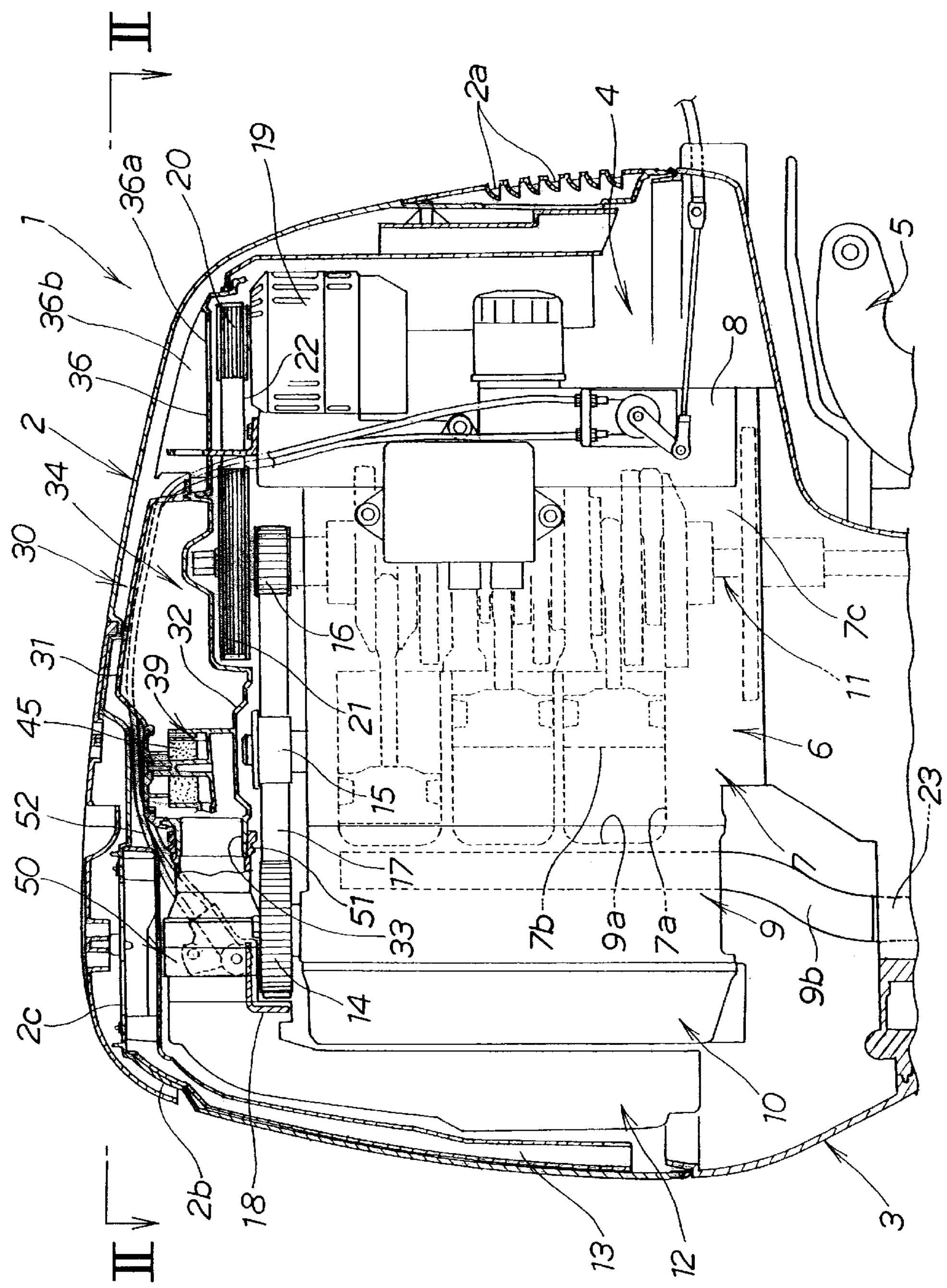
FIG. 1 is a cross-sectional view illustrating an upper half of an outboard engine employing an intake silencer according to the present invention.
Figure 2:
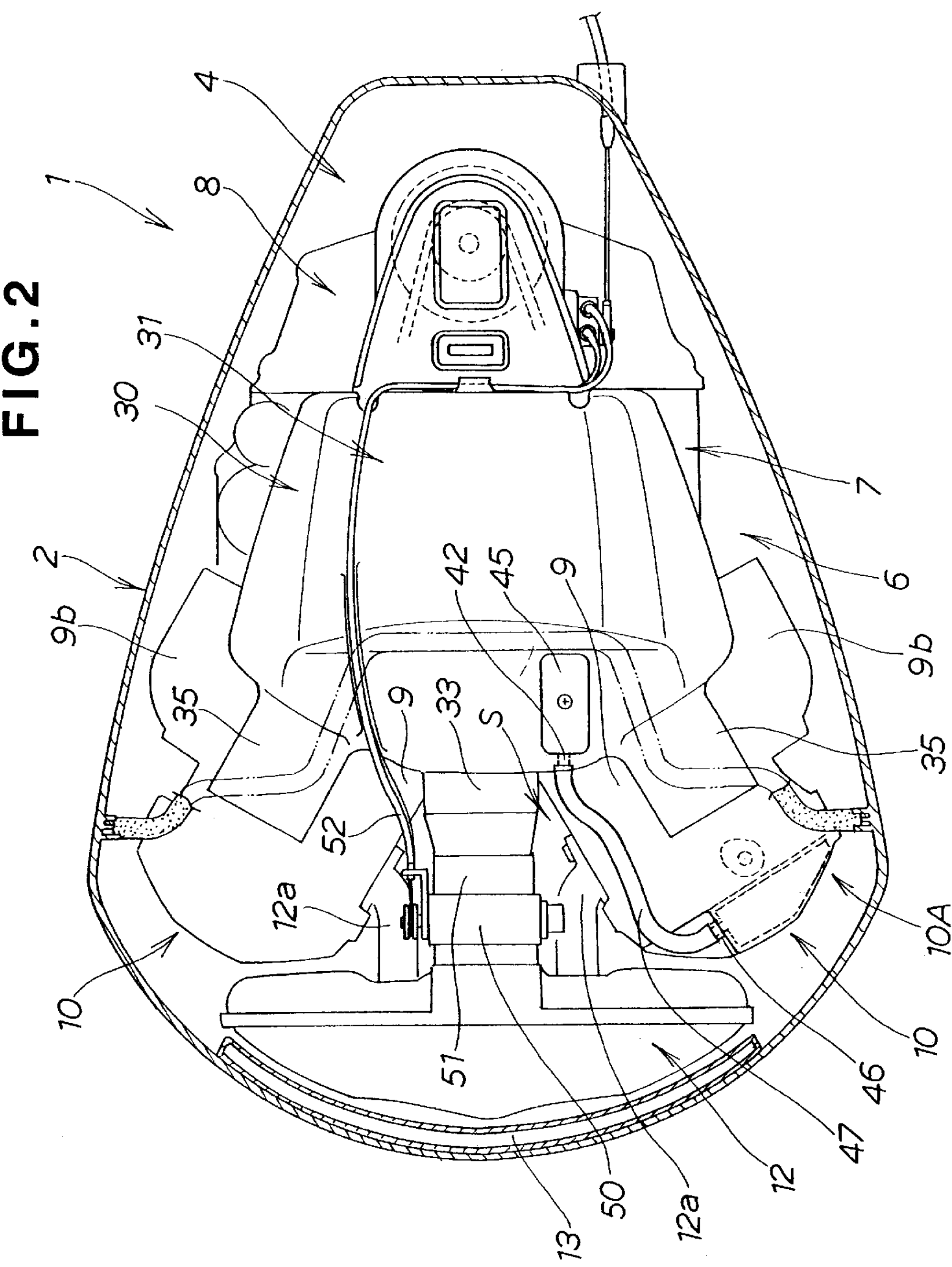
FIG. 2 is a cross-sectional view taken along line II—II of FIG. 1.

As shown in FIGS. 1 and 2, an intake silencer or muffler 30 of this invention is used, for example, on an outboard engine 1 of a boat. A cover constituting an outer configuration of the outboard engine 1 comprises a top most engine cover 2; an undercover 3 provided at a lower part of the engine cover 2; an extension case, not shown by is located at a lower part of the undercover 3; and a gear case having a screw for driving a propeller blade at a lower part of the extension case. A stern bracket 5 is placed between the undercover 3 and the extension case for attaching the outboard engine 1 to the stern of the boat. Engine cover 2 defines an engine space 4 or engine compartment.

Cooling air intake port 2*a* is formed in the front part of the engine cover. Outside air intake port 2*b* is formed on a rear top part of the engine cover 2. Outside air is introduced into the engine space 4 through an intake opening 2*c* and an intake guide 13.

Engine 6 comprises a cylinder block 7 provided in a middle part with respect to a front-and-back direction of the outboard engine 1, a crankcase 8 placed in a front part of a skirt 7*c* of the cylinder block 7, a cylinder head 9 located in a rear part of the cylinder block 7, and a cylinder head cover 10 placed in a rear part of the cylinder head 9.

Engine 6 used in the outboard engine 1 of this embodiment is a vertical engine, as is apparent from the Figures, with vertically placed crankshaft 11. The cylinder block 7 includes a plurality of cylinders 7*a*, three in the illustrated example embodiment, laid horizontally one over the other. Each cylinder 7*a* includes a piston 7*b* connected to the vertically extending crankshaft 11 through a connecting rod. The cylinder head 9 has combustion chambers 9*a* corresponding to each cylinder 7*a*.

As shown in FIG. 2, the engine 6 of this embodiment is V-shaped as viewed in top plan. The engine 6 is a V-type, 6-cylinder engine having three horizontal cylinders laid one over the other in each of the right and left cylinder blocks 7.

Intake manifold 12 is provided in vertical orientation in the rear of the cylinder head cover 10. As shown in FIG. 2, the intake manifold 12 is disposed to extend vertically in the rear part of a V bank S that diverges toward the rear of the engine 6, as viewed in top plan. Rearward of the engine intake manifold 12 is provided an intake guide 13 for bringing in air.

Intake manifold 12, as shown in FIG. 2, takes the form of a chamber, whose dimension in a front and back direction is smaller than a dimension in a right-and-left direction. The intake manifold 12 has intake tubes 12*a*, 12*a* provided on the sides of the cylinder heads 9, 9 and connected to the intake ports of the cylinder heads 9, 9. The intake tubes 12*a*, 12*a* are provided inside the V bank S of the engine.

As shown in FIG. 1, at an upper part of the engine 6, a camshaft pulley 14 is provided on a top surface of the cylinder head 9. A guide pulley 15 is provided on a top surface of the rear part of the cylinder block 7. A first drive pulley 16, driven by the crankshaft 11, is provided on a top surface of the skirt 7*c*.

Timing belt 17 is trained around the camshaft pulley 14 and the first drive pulley 16 for driving via the crankshaft 11 a camshaft not shown.

In FIG. 1, reference numeral 18 designates a cover of the camshaft pulleys 14 at right and left ends of the V bank.

A generator (alternating current generator: ACG) 19 is attached to a front surface of an upper part of the crankcase 8. The generator 19 includes a driven pulley 20 provided on a top surface thereof for driving the generator. At a top end of the crankshaft 11, a second drive pulley 21 is provided coaxially with the first drive pulley 16. The second drive pulley 21 and the driven pulley 20 are operatively connected by a timing belt 22 so that the generator 19 is driven by the crankshaft 11.

In FIGS. 2, 9*b*, 9*b* designate exhaust manifolds connected to the exhaust pipe 23 shown in FIG. 1. An exhaust pipe 23 extends downwardly from the mount cover 3 into the extension case for downward exhaustion.

Intake silencer 30, which takes the form of an intake box, is disposed in an upper frontal part of the engine 6 above part of the belt pulley mechanism other than that part covered by the cover 18 provided above the camshaft pulley 14. The belt pulley structure opens at right and left sides thereof. Heat generated by the belt drive is radiated to the right and left sides of the engine space 4.

Figure 3:
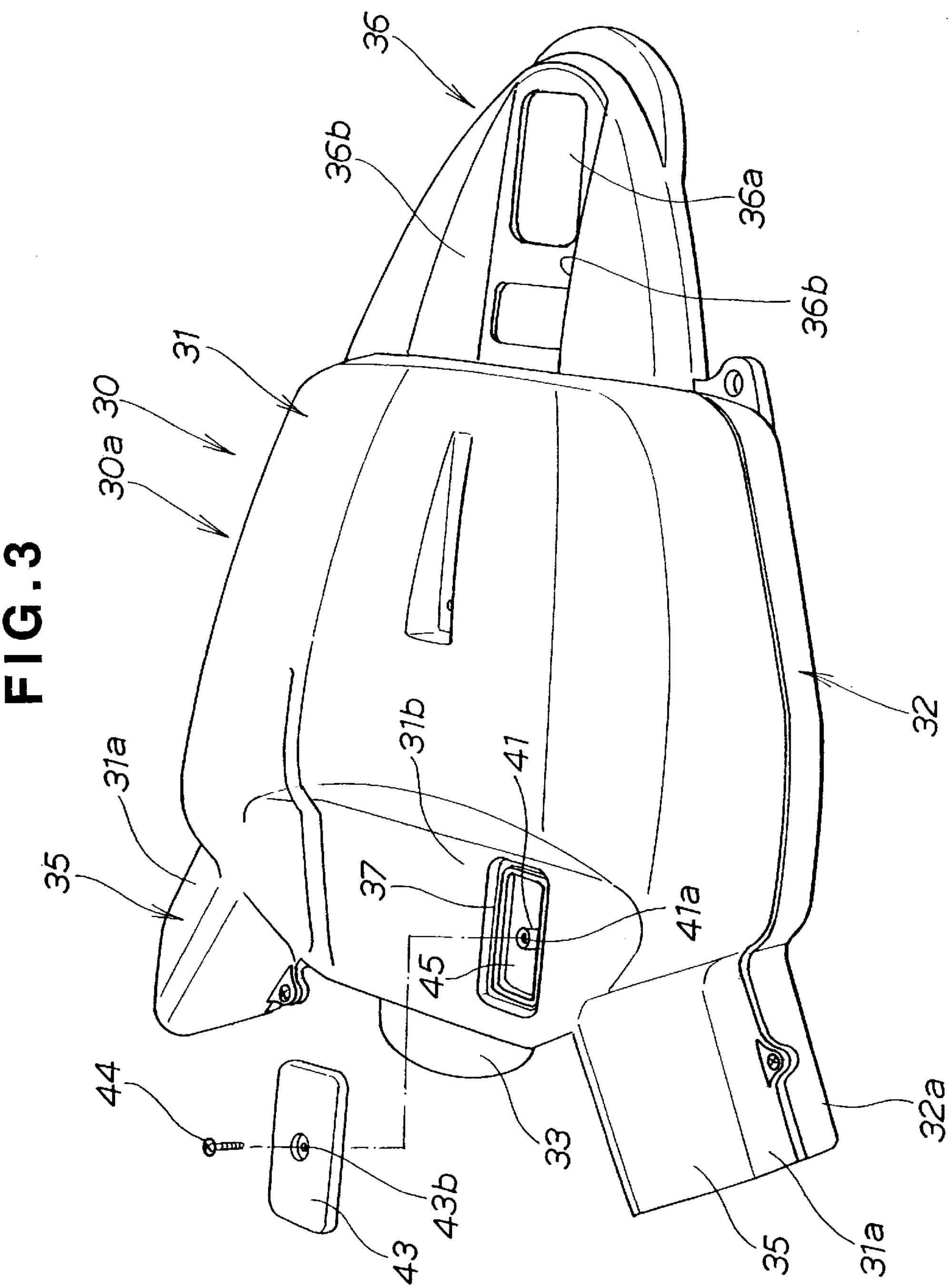
FIG. 3 is a perspective view illustrating the intake silencer according to a first embodiment of this invention.
Figure 4:
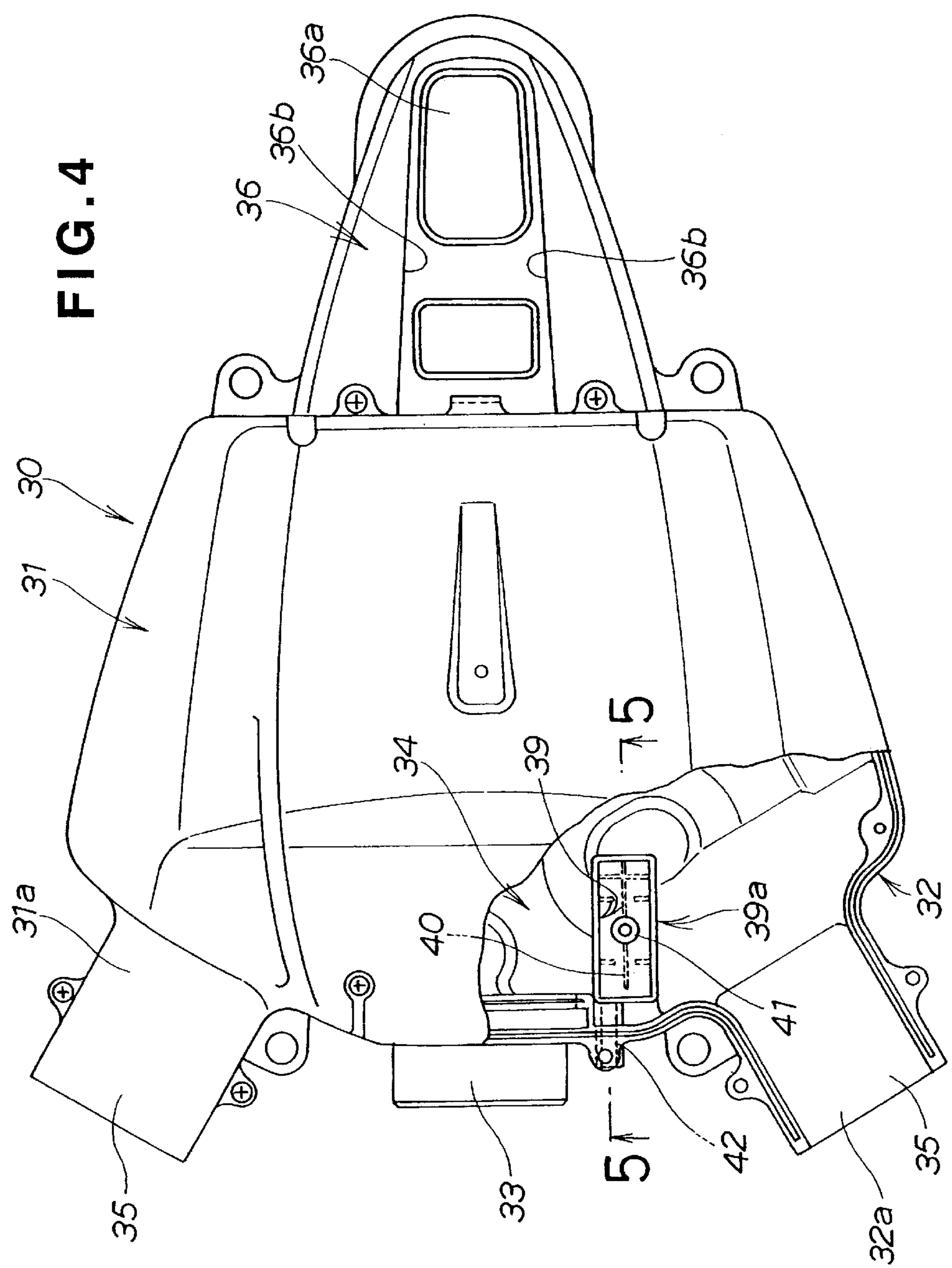
FIG. 4 is a top plan view illustrating the intake silencer partially cut away.

Reference is now made to FIG. 3 showing in perspective the intake silencer 30 of this invention, and FIG. 4 showing in top plan the intake silencer partially cut away.

Intake silencer 30 has an overall shape of a flat box. A main unit 30*a*, consisting of a ceiling or top portion, a bottom portion and sidewalls, is formed into a unit by joining an upper half 31, in the shape of an upside-down dish, and a lower half 32, in the shape of a dish, such that they lie on top of each other and define an internal chamber. The upper half 31 and the lower half 32 may be joined together using an adhesive, by vibration welding wherein surfaces to be joined together are placed in contact and exposed to vibration for welding, or by screw connection as required. A cylindrical connection duct 33 is disposed in the rear part of the lower half 32 such that it communicates with a muffling chamber 34 defined inside the lower half 32.

In the rear of the intake silencer 30 and on right and left of the connection duct 33 are intake ducts 35, 35 disposed around the connection duct 33 at the center and extending in the right and left directions at an angle to form a single unit.

In this embodiment, the intake ducts 35, 35 are provided by unitarily joining an inverted-tub-shaped part 31*a*, facing up, and a tub-shaped part 32*a*, facing down, in the rear right and left ends of the upper and lower halves 31, 32. At the front end of the box-shaped main unit 30*a* of the intake silencer 30 is a cover or extension part 36 that projects forwardly of the main unit. The cover part 36 includes a cooling air intake opening 36*a* and vertical walls 36*b*, 36*b* defining a guide path for air from the front. The cover part 36 covers the tops of the belt 22 and pulley 20 and part of the top of the pulley 21, as shown in FIG. 1.

Figure 5:
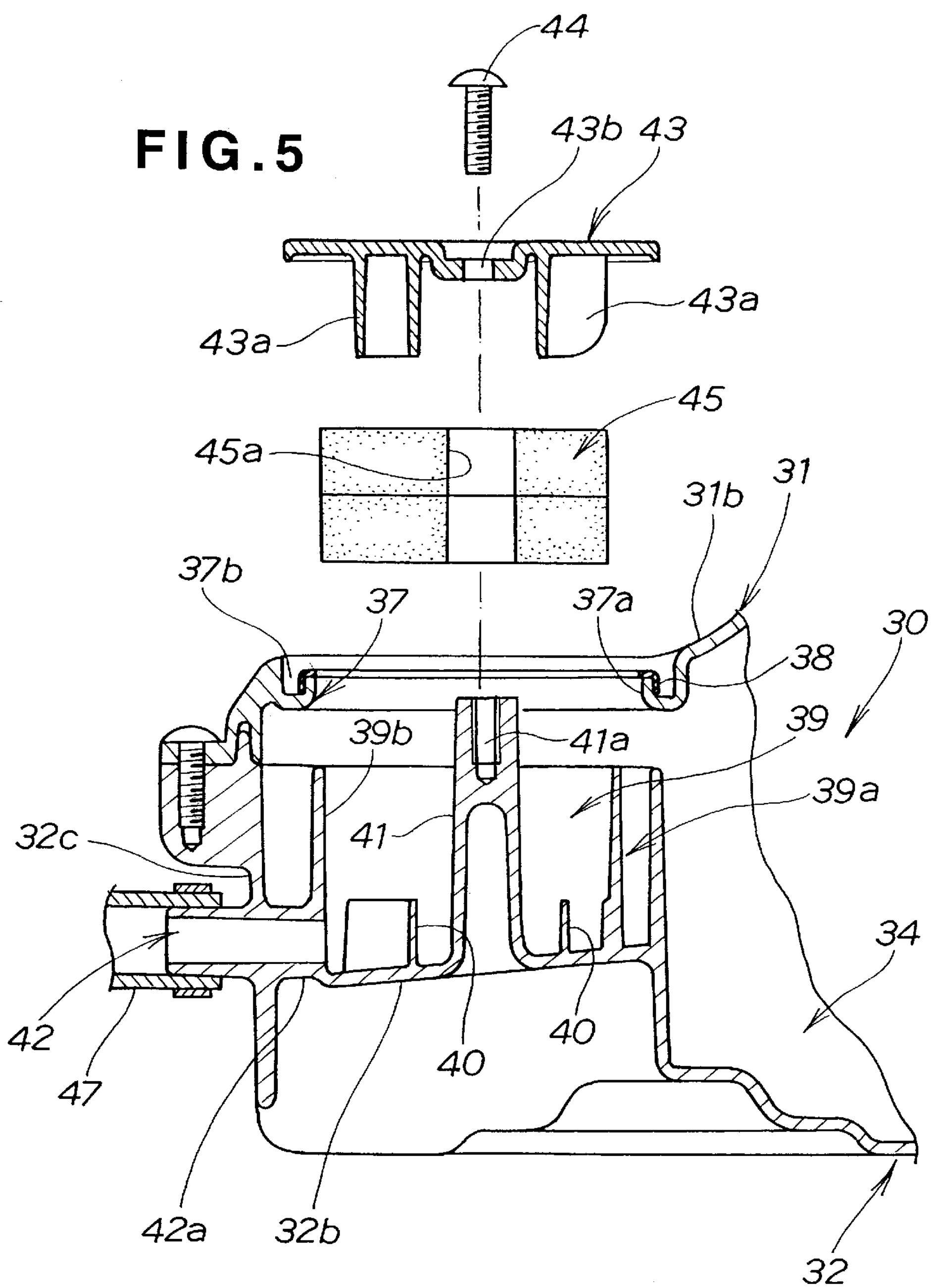
FIG. 5 is an exploded, cross-sectional view taken along line 5—5 of FIG. 4.

Referring to FIGS. 3 to 5, discussion will be made next as to a filter for purifying blow-by gas.

An opening 37 (FIG. 3), which extends in the front-and-back direction, is formed on the top surface 31*b* of the upper half 31 near one side of the connection duct 33 shown in FIG. 4. The opening 37 has a groove 37*b* provided at an inner periphery of the opening 37, which extends around the periphery and gets a step inside, and a rectangular frame 37*a* corresponding in shape to the opening 37. A seal material 38 is attached to the rectangular frame 37*a*.

As shown in FIG. 4, retaining frame 39*a*, which runs along the front-and-back direction as viewed in top plan, is formed on top of a bottom part 32*b* of the lower half 32 positioned below the opening 37. On the bottom part 32*b* of the retaining frame 39*a* is integrally formed a leg part 40 of a given height. A supporting column 41 is provided internally of the retaining frame 39*a* to extend vertically from a central part of the bottom part 32*b*. At the tip of the supporting column 41 is formed a screw hole 41*a*. A retaining part 39 for a filter 45 is formed within the retaining frame 39*a* and extends around the supporting column 41.

A connecting portion 42 of the breather passage, which runs in the back-and-front direction, is formed on a rear side wall 32*c* of the lower half 32. The connecting portion 42 is cylindrically shaped, runs in the back-and-front direction, and passes through the rear side wall 32*c* in the front-and-back direction. The connecting portion 42 has an extension part 42*a* projecting into the muffling chamber 34. The extension part 42*a* extends forward beyond the rear side wall 32*c* and opens at the lower part of the rear part 39*b* of the retaining part 39 to thereby communicate with a space where the leg piece 40 of the retaining part 39 is positioned.

Reference numeral 43 designates a lid member for covering the opening 37. The lid member 43 is rectangular in shape as viewed in top plan and includes a pressing leg piece 43*a* extending downwardly and an attachment hole 43*b* formed centrally thereof. Filter 45 for eliminating impurities like mist and oil from blow-by gas is rectangular in shape, as viewed in top plan, to match the shapes of the opening 37 and retaining part 39 and includes a through hole 45*a* formed centrally thereof.

Figure 6:
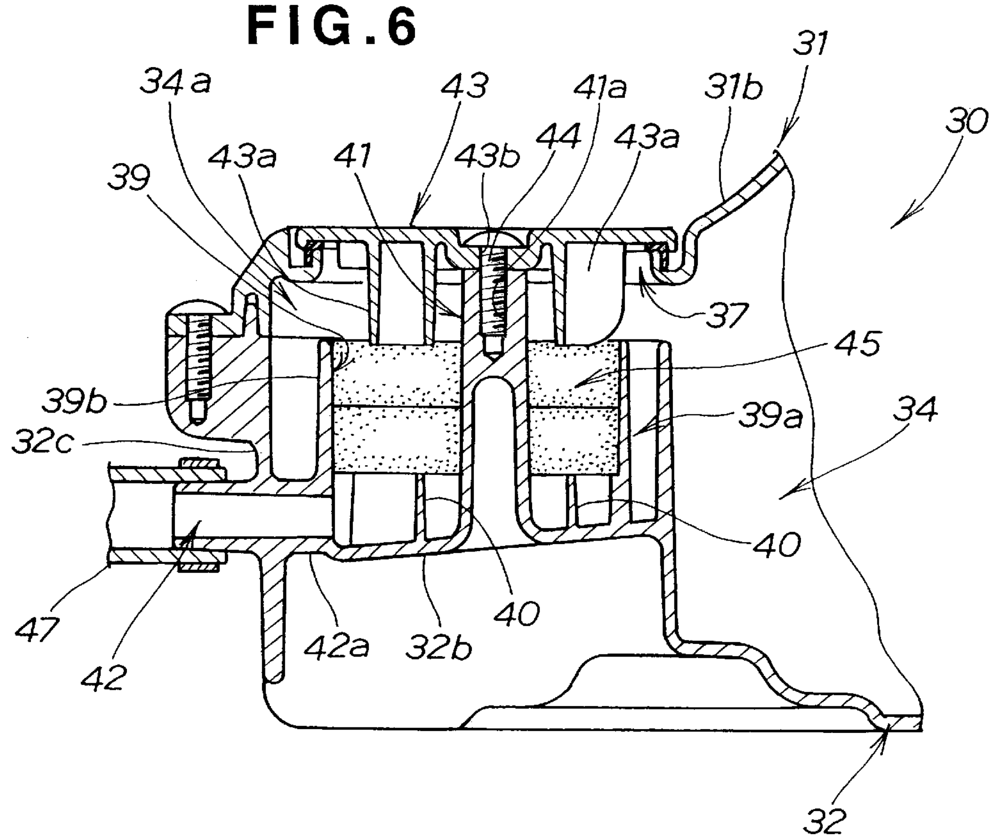
FIG. 6 is a cross-sectional view illustrating the intake silencer of FIG. 5, as assembled, with a filter attached thereto.

Referring now to FIG. 6, discussion will be made as to the intake silencer 30, as assembled, including the filter 45.

Filter 45 is inserted into the retaining part 39 from the upper part of the opening 37 formed in the upper half 31 of the silencer 30. Lower surface of the filter 45 is supported by the leg piece 40 in upwardly spaced relation to the bottom part 32*b* of the lower half 32. The lid part 43 is placed on top of the opening 37 to cover the opening 37. A screw 44 is threadedly engaged in the screw hole 41*a* of the support column 41 through an attachment hole 43*b* of the lid 43 to thereby attach the lid 43 to the lower half 32, while closing the opening 37 of the upper half 31 with the lid 43. The pressing leg piece 43*a* on the lower surface of the lid 43 presses down the filter 45 from above. The retaining frame 39*a* holds the periphery of the filter. As a result, the filter 45 is pressed from above and below by the pressing leg piece 43*a* and leg piece 40 and is supported by the retaining part 39.

The extension part 42*b* of the connecting part 42 projecting into the silencer 34 opens in the lower part of the filter 45 and communicates with the muffling chamber 34. Blow-by gas that flows in from the connecting part 42 passes through the filter 45 from below to above and is purified as impurities like mist and oil in the blow-by gas are removed. The purified blow-by gas flows from the space 34*a* below the lid 43 into the silencer 34 and returns to an intake port of a throttle valve apparatus 50, shown in FIGS. 1 and 2, through the connecting port 33 shown in FIG. 4.

As shown in FIGS. 1 and 2, the throttle valve apparatus 50 is disposed in the rear part of the connecting port 33 of the silencer 30. Grommet 51 connects the upstream part of the intake path of the throttle valve apparatus 50 and the downstream part of the connecting port 33. Downstream part of the intake path of the throttle valve apparatus 50 is connected to an intake port of the intake manifold 12.

Reference numeral 52 in FIGS. 1 and 2 designates a control cable for opening and closing a throttle valve in the throttle valve apparatus 50.

As shown in FIG. 2, a tubular connector 46 is disposed on the cylinder head cover 10A such that it communicates with the cam chamber inside the cylinder head cover 10A. The tubular connector 46 and the connector 42 of the intake silencer 30 are interconnected by means of a pipe 47. The pipe 47 forms the breather passage. As a result, the cam chamber inside the cylinder head cover 10A and the muffling chamber 34 of the intake silencer 30 communicate with each other.

Blow-by gas in the cam chamber inside the cylinder head cover 10A contains oil and flows into the muffling chamber 34 shown in FIG. 1. Mist and oil in the blow-by gas are removed by the filter 45. The purified blow-by gas is returned to an intake system. Fresh air in the muffling chamber 34 may pass through the pipe 47, which forms the breather passage shown in FIG. 2, and flow into the cylinder head 10A.

Turning to FIG. 6, for changing the filter 45, bolt 44 is removed to take the lid 43 off from the opening 37. Next, the filter 45 is taken out of the retaining part 39. Thereafter, a new filter is inserted into the opening 37. This is followed by closing the opening 37 with the lid 43 and tightening the bolt 44. In this manner, the filter changing operation can be performed easily and completed quickly.

As clearly illustrated in FIG. 1, the cylinder head cover 10 is placed in the rear end part of the engine 6, while the intake silencer 30 is placed in the upper part of the engine 6. As a result, at the connection of the pipe 47 that forms the breather passage, the connecting part 42 of the intake silencer 30 is placed at a higher position, while the connecting part 46 of the cylinder head cover 10A is placed at a lower position. Therefore, when a blow-by gas in the crank chamber passes through the breather passage from the cylinder head side to the side of the intake silencer 30, oil is unlikely to flow in, thus minimizing degradation of the filter 45.

Figure 7:
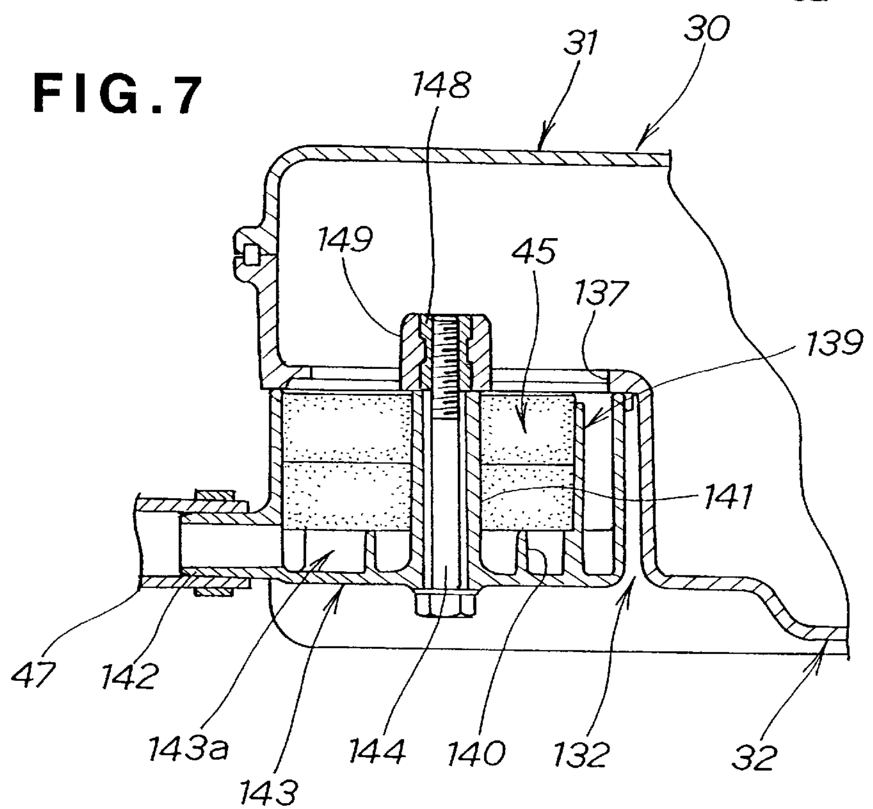
FIG. 7 is a cross-sectional view showing a filter attachment structure according to the second embodiment of the present invention.

Referring to FIG. 7, discussion will be made next as to the structure for mounting the filter to an intake silencer according to a second embodiment of the present invention.

Part of the bottom part of the rear part of the lower half 32 is raised to provide a recessed portion 132. An opening 137 is formed at a ceiling or top part of the recessed portion 132. A support member 149 is provided centrally of the recessed portion 132 so as to accommodate a nut 148 threadedly engaged with a bolt 144 passing through the lower half 32.

A recessed bottom lid 143 is provided for fitting in the recessed portion 132 and covering from below the opening 137. The bolt 144 is disposed to pass through the cylindrical support column 141 at the center of the bottom lid 143 and threadedly engaged with the nut 148. The opening 137 is closed by the bottom lid 143 from below.

The bottom lid 143 includes a retaining portion 139 on the bottom surface. The retaining portion 139 includes a plurality of leg pieces 140 extending upwardly toward the opening 137. The filter 45 is held within the retaining part 139. The opening 137 is closed by the bottom lid 143 through the filter 45.

Bottom lid 143 includes a tubular connecting part 142 connected to the pipe 47 forming the breather passage. Blow-by gas flows into a lower space 143*a* defined below the filter 45 and is purified by the filter 45.

In the breather passage of the embodiments described above, it was emphasized that the blow-by gas flows from the cylinder head side to the intake silencer side. However, the blow-by gas may flow from the intake silencer side to the cylinder head side when the intake silencer is placed far away from the intake manifold and intake pressure is small.

The present disclosure relates to the subject matter of Japanese Patent Application No. 2001-036695, filed Feb. 14, 2001, the disclosure of which is expressly incorporated herein by reference in its entirety.

What is claimed is:

1. An intake silencer for an engine, comprising: a breather passage in communication with a space defined in a cylinder head cover of the engine to receive blow-by gas generated inside the engine and return the blow-by gas to an intake side of the engine; a main box unit formed by joining an upper half and a lower half in a unitary structure to define the breather passage therein; a connecting duct for connecting the breather passage to the intake side of the engine; an intake duct for bringing in outside air to the breather passage; and a filter for purifying the blow-by gas, the filter being held within an opening defined in the main box unit by the upper and lower halves.

2. An intake silencer for an engine, comprising: a breather passage in communication with a space defined in a cylinder head cover of the engine to receive blow-by gas generated inside the engine and return the blow-by gas to an intake side of the engine; a main box unit formed by joining an upper half and a lower half in a unitary structure to define the breather passage therein; a connecting duct for connecting the breather passage to the intake side of the engine; an intake duct for bringing in outside air to the breather passage; and a filter for purifying the blow-by gas, the filter being held within an opening defined in the main box unit by the upper and lower halves; wherein the upper half of the intake silencer has a filter retaining portion provided with an opening, the opening is closed by a lid connected via a connecting member to the lower half, and the filter is held between a retaining portion provided on a rear surface of the lid and a retaining portion provided on the lower half.

3. An intake silencer for an engine, comprising: a breather passage in communication with a space defined in a cylinder head cover of the engine to receive blow-by gas generated inside the engine and return the blow-by gas to an intake side of the engine; a main box unit formed by joining an upper half and a lower half in a unitary structure to define the breather passage therein; a connecting duct for connecting the breather passage to the intake side of the engine; an intake duct for bringing in outside air to the breather passage; and a filter for purifying the blow-by gas, the filter being held within an opening defined in the main box unit by the upper and lower halves; wherein the lower half of the intake silencer has a bottom with an opening formed therein, the opening is closed by a releasably attached bottom lid, the filter is retained by a retaining portion provided on a top surface of the bottom lid, and the bottom lid has a connecting portion provided on a part thereof upstream of the filter for forming the breather passage.

4. An intake silencer for an engine, comprising: a breather passage in communication with a apace defined in a cylinder head cover of the engine to receive blow-by gas generated inside the engine and return the blow-by gas to an intake side of the engine; a main box unit formed by joining an upper half and a lower half in a unitary structure to define the breather passage therein; a connecting duct for connecting the breather passage to the intake side of the engine; an intake duct for bringing in outside air to the breather passage; and a filter for purifying the blow-by gas, the filter being held within an opening defined in the main box unit by the upper and lower halves; wherein the breather passage of the intake silencer has an inlet disposed at a higher position, and the breather passage of the cylinder head cover has an outlet disposed at a lower position.

5. An intake silencer for an engine according to claim 1; wherein the intake silencer is disposed above the engine and the breather passage has an inlet connected to the intake silencer and an outlet connected to the cylinder head cover of the engine, the inlet of the breather passage being disposed above the outlet of the breather passage.

6. An outboard motor comprising: a V type engine having an engine block provided with two cylinder blocks extending in a V configuration and forming therebetween an opening which opens to the rear of the outboard motor, a skirt integrally formed with the cylinder blocks and housing a crankshaft arranged vertically therein, and two cylinder heads provided on ends of the cylinder blocks to define a plurality of combustion chambers; and an intake silencer having two inlets positioned above the cylinder heads and forming an opening therebetween which opens rearward of the outboard motor for taking air in, and one outlet positioned between the two inlets for letting the inlet air out to supply it to the combustion chambers, the intake silencer comprising a main box having an upper half and a lower half joined together in an integral structure to define a breather passage, a connecting duct for connecting the breather passage to an intake side of the engine, an intake duct for bringing in outside air, and a filter for purifying the blow-by gas, the filter being held by the upper and lower halves within the main box unit in communication with the space defined by the cylinder head cover.

7. An outboard motor according to claim 6; further comprising a transmission system for transmitting a drive force from the crankshaft to a camshaft for opening or closing intake valves and exhaust valves provided in the combustion chambers, the transmission system being provided between the engine block and the intake silencer.

8. An outboard motor according to claim 7; further comprising a throttle body connected to the outlet of the intake silencer and arranged between the cylinder and above the camshaft.

9. An outboard motor according to claim 8; further comprising a grommet for connecting the outlet of the intake silencer to the throttle body.

10. An outboard motor according to claim 6; wherein the intake silencer has a body with a substantially flat top wall.

* * * * *